W. N. THOMPSON.
AMMONIA LEAK TESTER.
APPLICATION FILED MAY 28, 1907.
977,761.
Patented Dec. 6, 1910.
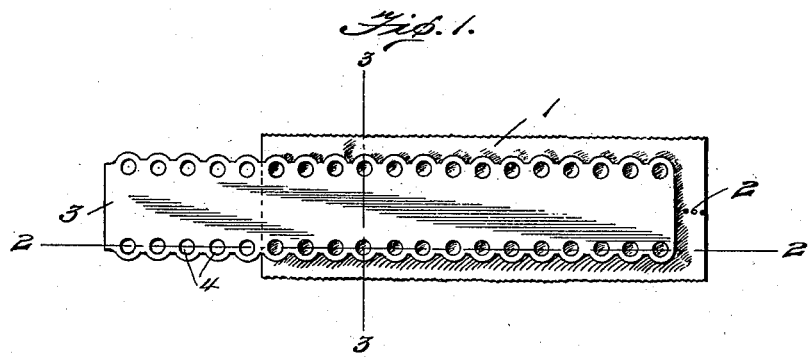
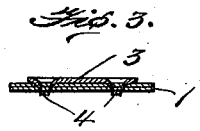
WITNESSES:
INVENTOR
Walter N. Thompson
BY Henry N. Copp
his Attorney

UNITED STATES PATENT OFFICE.

WALTER NORTON THOMPSON, OF TUCSON, ARIZONA TERRITORY.

AMMONIA-LEAK TESTER.

977,761.  Specification of Letters Patent.  Patented Dec. 6, 1910.

Application filed May 28, 1907. Serial No. 376,141.

*To all whom it may concern:*

Be it known that I, WALTER NORTON THOMPSON, a citizen of the United States, residing at Tucson, county of Pima, and Territory of Arizona, have invented certain new and useful Improvements in Ammonia-Leak Testers, of which the following is a specification.

My invention relates to ammonia leak testers.

Heretofore it has been a common practice to test for the leakage of ammonia from fittings such as valves, joints, pipes, etc., conveying ammonia, by specially prepared test paper which is first wet. This test paper, when wet, has no rigidity and is not easily handled and is difficult to hold closely to the joints, valves, and other parts of ammonia fittings for the detection of leaks.

My invention has for its object the provision of an ammonia leak tester which will be simple and cheap, possesses all the advantages of the ordinary test paper, and will be sufficiently rigid so that it may be easily held against any part of the ammonia fittings and closely applied thereto, regardless of the position assumed by the tester.

To carry out the foregoing object, I combine with the test paper heretofore used a stiffener of a material not affected by moisture.

The invention is set forth hereinafter and is shown in the accompanying drawings, in which—

Figure 1 is a front view, considerably enlarged, showing the invention; Fig. 2 is a longitudinal section on line 2—2 thereof; and Fig. 3 is a cross-section on line 3—3 thereof.

The test paper ordinarily used for detecting ammonia leaks is shown at 1, being made in sections, by the provision of perforations 2, whereby a strip of the paper may be torn off to constitute a test strip. Ordinarily this paper is first moistened and is then held in the fingers and applied to the fittings, but moistening causes it to droop and curl and makes it difficult to properly apply the test paper in certain places.

To remedy the defect heretofore existing, I provide a stiffener 3 which, in the present instance, is of metal capable of being readily bent to the desired form, and this stiffener has struck-up parts 4 which engage the paper 1. The stiffener may be of any desired material, metal or otherwise, which will not be affected by moisture. One end of the stiffener extends beyond the paper for convenient grasping by the fingers of the user. The test paper can be detached and other pieces connected to the stiffener or strips removed from the paper itself.

Having thus described my invention, what I claim as new and desire to secure by Letters Patent, is:—

1. A leak tester consisting of test paper and a stiffener or holder therefor having struck-up parts which engage the test paper, said stiffener constituting a backing which holds the test paper in extended condition.

2. A leak tester consisting of test paper and a stiffener or holder having a plurality of struck-up parts formed by perforations which engage the test paper, said stiffener constituting a backing which holds the test paper in extended condition.

In testimony whereof, I hereunto affix my signature in presence of two witnesses.

WALTER NORTON THOMPSON.

Witnesses:
FRANK L. CULM,
P. F. HUGHES.